Figure 1:
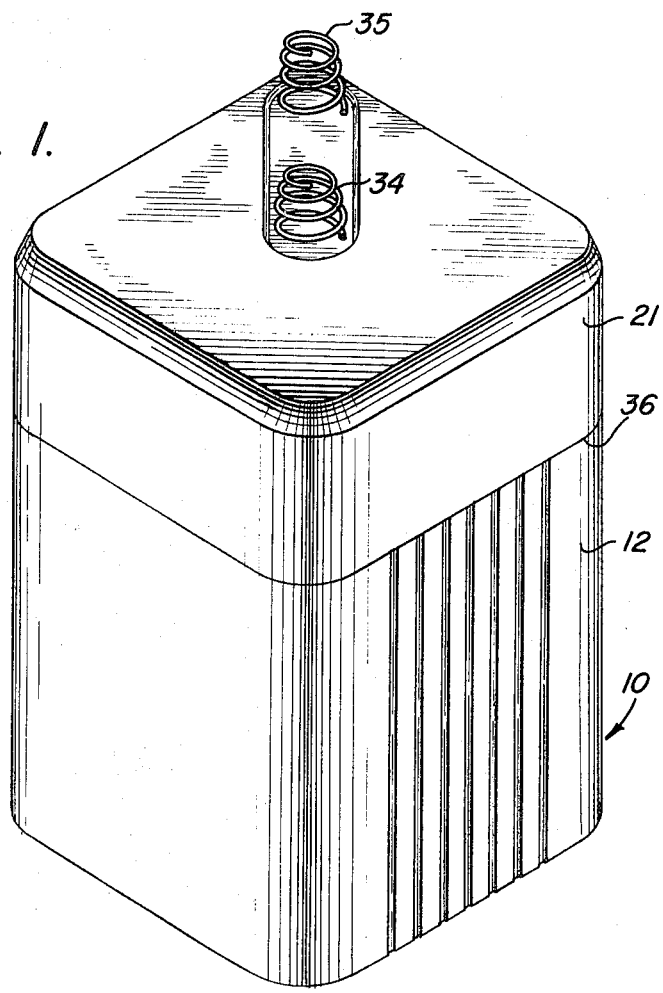

United States Patent
Brindley

[15] 3,650,841
[45] Mar. 21, 1972

[54] MULTIPLE CELL GALVANIC BATTERY

[72] Inventor: Robert Edwin Brindley, New York, N.Y.

[73] Assignee: Union Carbide Corporation, New York, N.Y.

[22] Filed: Jan. 20, 1970

[21] Appl. No.: 3,720

[52] U.S. Cl. ............................136/132, 136/134, 136/166, 136/173
[51] Int. Cl. .................................................H01m 1/02
[58] Field of Search.................136/132, 166, 173, 108, 169, 136/170, 134

[56] References Cited

UNITED STATES PATENTS

| | | | |
|---|---|---|---|
| 1,075,556 | 10/1923 | Fenoughty | 136/173 |
| 1,316,567 | 9/1919 | Koretzky et al. | 136/173 |
| 2,355,197 | 8/1944 | Anthony et al. | 136/132 |
| 3,056,850 | 10/1962 | Rauske et al. | 136/173 |
| 3,110,634 | 11/1963 | Bradshaw | 136/173 |
| 3,484,299 | 12/1969 | Nyberg et al. | 136/170 |

Primary Examiner—Donald L. Walton
Attorney—Paul A. Rose, John F. Hohmann and John R. Doherty

[57] ABSTRACT

A multiple cell galvanic battery and particularly a container assembly therefor comprising a container with individual compartments for the cells and a cover which fits over the container and seals off the individual compartments. The cells are connected electrically in either series, parallel, or series-parallel relationship by the use of intercell connectors and intercell connecting clips. Battery terminals are sealed to, and extend through, the cover to provide external electrical contact with the battery. The bond between the cover and container supplies sufficient mechanical pressure to maintain good electrical contact between the intercell connectors, cell electrodes and external battery terminals.

9 Claims, 8 Drawing Figures

Patented March 21, 1972
3,650,841

4 Sheets-Sheet 1

INVENTOR
Robert E. Brindley
BY
ATTORNEY

Patented March 21, 1972

3,650,841

4 Sheets-Sheet 2

INVENTOR
Robert E. Brindley
BY
ATTORNEY

Patented March 21, 1972

3,650,841

4 Sheets-Sheet 3

INVENTOR
Robert E. Brindley
BY
ATTORNEY

Patented March 21, 1972 3,650,841

4 Sheets-Sheet 4

INVENTOR
Robert E. Brindley
BY
ATTORNEY

MULTIPLE CELL GALVANIC BATTERY

This invention relates to a new and improved multiple cell galvanic battery and in particular to a container assembly for such battery.

Standard galvanic dry cells usually produce an open circuit voltage of about 1.5 volts. When a higher voltage is required, it is customary to combine a multiplicity of these cells to form a battery having the required voltage. The cells are usually disposed in a container and connected in series, parallel, or series-parallel with external terminals attached to the container and making contact with the cells. Therefore, a 6-volt battery, commonly used in portable lanterns, would contain four 1.5-volt cells connected in series.

The individual galvanic cells within the multiple cell battery conventionally may be connected electrically by soldering leads to the appropriate cell electrodes. Soldering the connections is a costly step, however, in assembling the battery. The soldering must be done manually and consistent quality connections are hard to achieve. Also, if the batteries are subjected to severe shock and/or vibration, either in shipment or in usage, the soldered joints may be damaged or sometimes completely destroyed.

Another more recent type of multiple cell battery has eliminated the necessity for soldered connections to electrically connect the cells. The battery utilizes pressure contact conducting strips to achieve proper intercell electrical connection. These strips are usually held in place by spring means which provide the necessary pressure to insure proper electrical contact between the individual cells and the strips. This construction has a lower assembly cost and is more shock and vibration resistant than the soldered connection type. Military usage, however, has put more stringent demands on the ability of a multiple cell battery to withstand shock and vibration. It is not uncommon for batteries to undergo severe shock and vibration during usage or shipment, especially in the extraordinary modes of transporting, delivering and use of military equipment. This severe shock and/or vibration may result in damage to the conventional multiple cell battery.

Another problem with conventional multiple cell batteries is the possible leakage of corrosive exudate from the individual cells. Due to the close proximity of the cells to one another, the exudate leakage from one cell may promote leakage in the other cells by externally corroding the outer casing, usually a zinc can, of an adjacent cell.

It is, therefore, an important object of this invention to provide a multiple cell galvanic battery which is more shock and vibration resistant than those presently available.

A more specific object of this invention is to provide a battery having improved means for achieving electrical connection between the individual cells in the battery.

Another object of this invention is to provide a multiple cell galvanic battery incorporating means for containing any exudate leakage from the individual cells and for preventing its contact with adjacent cells in the battery.

Still another object of this invention is to provide a multiple cell galvanic battery which is easy to assemble and less expensive to manufacture than those presently available.

The foregoing and other objects are achieved by the multiple cell galvanic battery of the invention which comprises a container for the individual galvanic cells, intercell connectors electrically connecting the individual cells, and a cover for the container which is so assembled as to provide adequate mechanical pressure to insure good electrical contact between the cell electrodes, intercell connectors and battery terminals.

The novel features of the container assembly, which result in a multiple cell battery of improved construction, include a container which may be rectangular, cylindrical, modified cylindrical, or modified rectangular, with partition members disposed within the container forming individual compartments for the galvanic cells, a cover with webs which fit over the partition members on the open end of the container so as to seal off the individual compartments, and a bond between the cover and container which maintains sufficient mechanical pressure between the intercell connectors, cell electrodes and battery terminals to insure the maintenance of good electrical contact between these members without any additional spring means within the battery.

Figure 6:
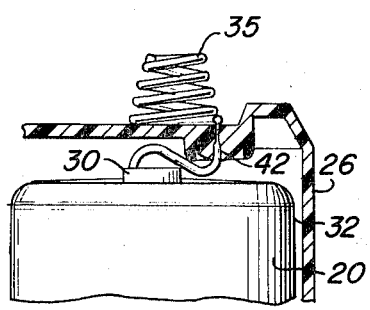
Figure 7:
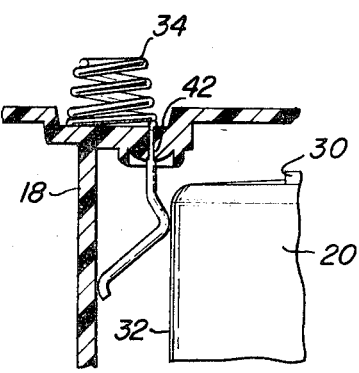
Figure 2:
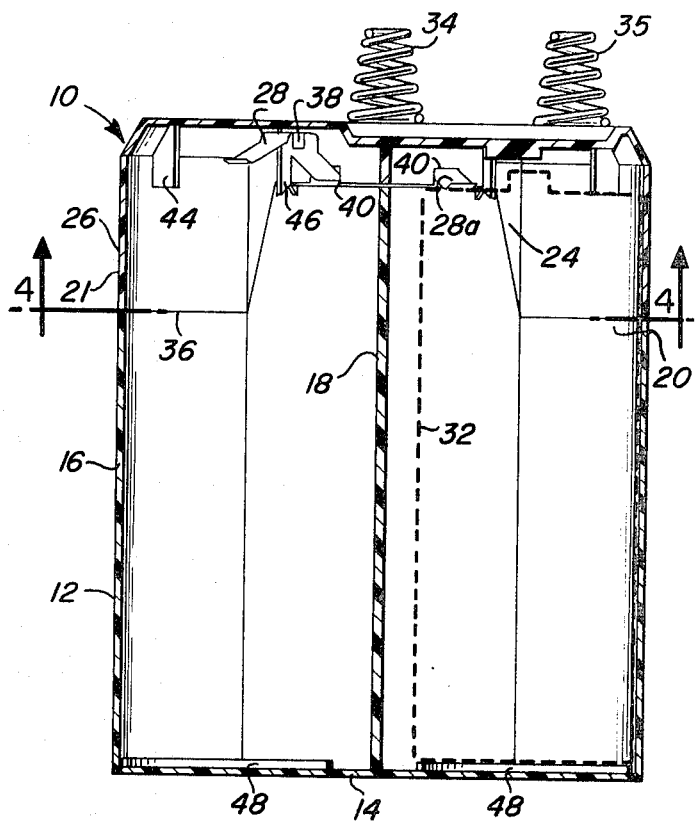
Figure 3:
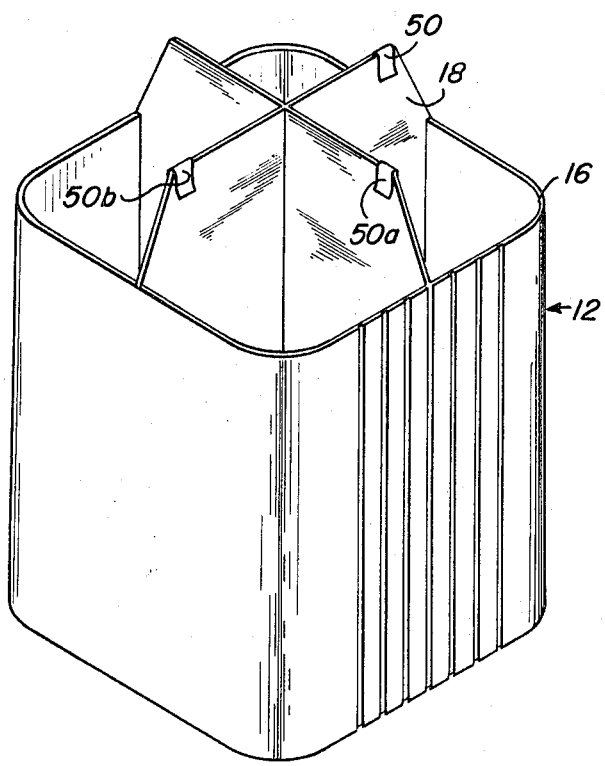
Figure 4:
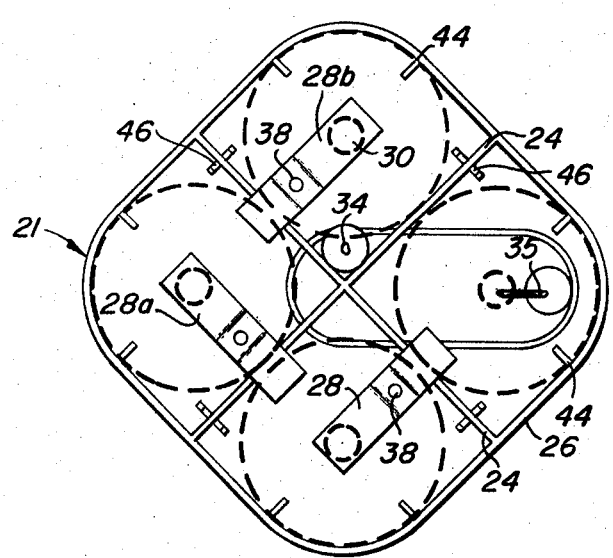
Figure 5:
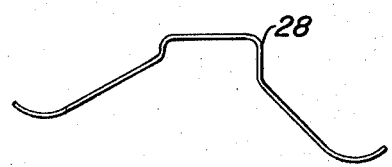
Figure 8:
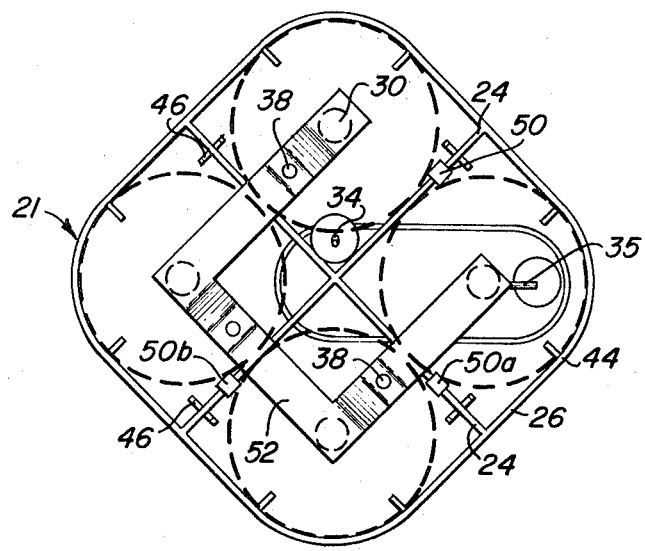

A fuller understanding of this invention will be facilitated by reference to the accompanying drawing, in which:

FIG. 1 is an isometric view of a multiple cell galvanic battery made according to this invention;
FIG. 2 is a vertical section through battery of FIG. 1;
FIG. 3 is an isometric view of the battery container;
FIG. 4 is a horizontal section taken on line 4—4 in FIG. 2;
FIG. 5 is an enlarged view of an intercell connector used in the battery of FIG. 1;
FIG. 6 is an enlarged partial sectional view of the juncture of the positive battery terminal and the cover;
FIG. 7 is an enlarged partial sectional view of the juncture of the negative battery terminal and the cover; and
FIG. 8 is a view similar to FIG. 4 showing a modification of the invention.

In particular, and with reference to FIGS. 1, 2, 3 and 4 of the accompanying drawing, a battery according to this invention, denoted generally at 10, comprises a container 12, having a base 14 and side walls 16, partition members 18 integrally formed with the base 14 and side walls 16, within the container 12 and forming four individual compartments in each one of which is disposed an individual galvanic cell 20, a cover 21 integrally formed with webs 24 and side walls 26, intercell connectors 28, 28a, 28b, electrically connecting the positive electrode 30 of one cell 20 to the negative electrode 32 of an adjacent cell 20 and battery terminals 34, 35 which pass through the cover 21 and provide external terminal correction to the battery assembly 10. The bond 36 between the cover 21 and the container 12 maintains sufficient mechanical pressure between the intercell connectors 28, 28a, 28b, cell electrodes 20, 32 and the battery terminals 34, 35 to insure good electrical contact. The bond 36 is formed along the periphery of the cover side walls 26 and container side walls 16 and along the intersection of the cover webs 24 and the container partition members 18.

The intercell connectors 28, 28a, 28b are fastened to the cover 21 by sprues 38 and pass through notches 40 in the cover webs 24 to make electrical connection with the individual galvanic cells 20. In the arrangement shown in FIGS. 1–3, 13, the intercell connectors 28, 28a, 28b connect the positive electrode 30 of each cell 20 to the negative electrode 32 of an adjacent cell 20 in series relationship. The battery terminals 34, 35 are sealed to the cover 21 by an integral seal 42 on the inside of the cover 21.

A boss 44 is integrally formed with the cover 21 to prevent cell movement along an axis parallel to the container side walls 16. The boss 44 provides added protection against damage when the battery 10 is subjected to severe shock or vibration.

Alignment means 46 are integrally formed with the cover webs 24 to insure proper alignment between the cover webs 24 and the container partition members 18 during formation of the bond 36.

A circular ridge 48 in cooperation with the base 14 forms a crater-like structure on top of which a galvanic cell 20 rests. Any expansion of the cell 20 due to intercell gases will be taken up by the expansion into the center of the crater.

It may be readily seen that any type of cylindrical galvanic cell can be used in the battery of the invention. Thus the galvanic cells used may be of the primary or secondary type and the size or number of cells utilized may be varied as will readily occur to one skilled in the art.

It may also be readily seen that the battery assembly may be modified to provide a parallel connected battery as shown in FIG. 8. In this arrangement the intercell connecting clips 28, 28a, 28b may be replaced by one U-shaped intercell connector 52 and intercell 1⅛clips 50, 50a, 50b, shown in FIG. 3, added to electrically connect the cells 20 in parallel relationship. The clips 50, 50a, 50b, are secured to the container partition members 18 and electrically connect the negative electrode 32 of one cell 20 to the negative electrode 32 of an adjacent cell 20. The U-shaped intercell connector 52 electrically connects only the positive electrodes 30 of adjacent cells 20. A series - parallel connected battery can be made by utilizing a combination of an intercell connecting clip and intercell connectors of the type utilized in the series and parallel connected batteries described above.

An important feature of this invention is the bond between the cover side walls and the container side walls. The bond must have sufficient strength to keep the necessary contact pressure between the intercell connectors, the cells, and the battery terminals. The intercell connectors and the portion of the battery terminals within the container are made of a flexible conductive metal. The intercell connectors rest upon the electrodes and because of the flexibility of these connectors, pressure must be exerted to force the cover side walls against the container side walls for the bond to be formed. In the preferred embodiment of the invention, the bond is ultrasonically formed. The bond by compressing the cover against the container, creates pressure between the intercell connectors, battery terminals, and the cells, thereby providing good electrical contact.

The bond between the cover webs and container partition members serves a dual purpose, i.e., (1) the bond cooperates in providing the necessary mechanical pressure for achieving good electrical contact between the intercell connectors, the cells and battery terminals and (2) the bond in cooperation with the webs and partition members, forms individual compartments within which the individual galvanic cells are disposed. These compartments serve the purpose of containing any exudate leakage from the individual cells and prohibiting the exudate leakage from coming into contact with adjacent cells and corroding them during use of the battery.

The intercell connectors are arranged in the cover in such a way as to enable placement of the cover upon the container in any one of four positions, each 90° apart, without imparing the electrical contact between the cells, intercell connectors and battery terminals. Also, due to the internal connector arrangement, all the cells are placed within the container compartments with the positive electrode at the open end of the container.

The cover and container materials of construction should be impervious to the constituents of the cells and electrically nonconductive. The material used must be at least as shock and vibration resistant as the rest of the battery. The container need not be rigid, since the galvanic dry cells, which are rigid in construction, make the battery assemblage rigid when the cells are disposed with the container.

The cover with cover webs, alignment means and boss is integrally formed by injection molding a suitable plastic such as polystyrene, polyolefins, acrylo butadiene styrene, polyvinyl chloride, polycarbonates, etc. The container with partition members and circular ridges is also integrally formed by injection molding a suitable plastic. In the preferred embodiment of the invention the cover and container are molded of a rubber modified polystyrene.

It will be apparent to anyone skilled in the battery art that many types of battery terminals may be utilized in the battery of this invention. For example, the screw type, plug type, clip type or the coil spring type (depicted in drawings) are some of the battery terminal configurations which may be used.

The limited number of parts, consisting of the container, the cover, the galvanic cells, the intercell connectors, and the battery terminals, makes the assembly of the battery easier than those presently available. The ease of assembly plus the elimination of the need of soldered intercell connections effectively reduces the assembly cost below that of multiple cell batteries which are presently available.

The following are specific examples of the practice of this invention:

EXAMPLE I

A 6-volt lantern battery made according to this invention consisted of the following parts:

A rectangular container about 2¾ inches long by 2⅝ inches square, having the corners rounded and one open end; partition members, about 3⅜ inches long, disposed within and integrally formed with the container; a rectangular cover 1 inches long by 2⅝ inches square, having the corners rounded; cover webs, disposed within the integrally formed with the cover; three intercell connectors of 0.015-inch tin plated steel, one-fourth inch wide and fastened to the cover by sprues which pass through an ⅛-inch hole in the connectors; four conventional cylindrical cells placed individually within the individual compartments of the container, the intercell connectors connecting the positive pole of one cell and the negative pole of an adjacent cell; and two coil spring terminals, one from the positive end and one from the negative end of the series battery, extending out through the cover.

EXAMPLE II

A 1.5-volt multiple cell battery made according to this invention consisted of the following parts:

A rectangular container about 2¾ inches long by 2⅝ inches square, having the corners rounded and one open end; partition members, about 3⅜ inches long, disposed within and integrally formed with the container; a rectangular cover 1⅛ inch long by 2⅝ inches square, having the corners rounded; cover webs, disposed within and integrally formed with the cover; a U-shaped intercell connectors of 0.015-inch tin plated steel, one-fourth inch wide and fastened to the cover by sprues which pass through ⅛-inch holes in the connector; three intercell connecting clips of 0.015-inch tin plated steel, three-sixteenth inch wide and pressure fitted onto the container partition members; four conventional cylindrical cells placed individually within the individual compartments of the container, the intercell connectors connecting the positive pole of one cell and the positive pole of an adjacent cell, and the intercell connecting clips connecting the negative pole of one cell and the negative pole of an adjacent cell; and two cap screw terminals, one from the positive end and one from the negative end of the parallel connected battery, extending out through the cover.

Batteries made according to this invention, having a construction similar to that described in Example I, and conventional batteries have been made and tested. The conventional batteries were of the type which utilize pressure contact conducting strips for electrical connection between cells, which strips were held in place by a spring means to insure electrical contact. All the batteries were subjected to the same test conditions, i.e., consecutive free fall drops of 3 feet, 4 feet, 5 feet and 6 feet respectively until the battery went open circuit. The voltage of the batteries was measured after each drop at the specified height level.

Table I below is a compilation of data taken from the above described tests. The batteries made according to this invention are denoted generally as Type A and the conventional batteries are denoted generally as Type B.

CONSECUTIVE FREE FALL DROP TESTS

| | Battery No. | Initial volts | Voltage subsequent to— | | | |
|---|---|---|---|---|---|---|
| | | | 3' drop | 4' drop | 5' drop | 6' drop |
| Type A | 1 | 6.2 | 6.2 | 6.2 | 6.2 | 6.2 |
| | 2 | 6.4 | 6.4 | 6.4 | 6.4 | 6.4 |
| | 3 | 6.35 | 6.35 | 6.35 | 6.35 | 6.35 |
| | 4 | 6.35 | 6.35 | 0 | | |
| | 5 | 6.45 | 6.45 | 6.45 | 6.45 | 6.45 |
| Type B | 6 | 6.4 | 0 | | | |
| | 7 | 6.4 | 0 | | | |
| | 8 | 6.4 | 0 | | | |
| | 9 | 6.4 | 6.3 | 0 | | |
| | 10 | 6.4 | 6.3 | 0 | | |

A consideration of the data presented in Table I above shows the batteries made according to this invention to be superior to conventional batteries in resistance to severe shock.

What is claimed is:

1. A battery comprising, in combination:
   a. an electrically nonconductive container having a base, side walls, and an open end;
   b. partition members disposed inside said container, said partition members being substantially parallel to said side walls extending beyond the edge of said side walls at the open end of said container so as to form open-ended compartments;
   c. a multiplicity of galvanic cells, having electrodes of opposite polarity, individually disposed in said compartments;
   d. an electrically nonconductive cover having side walls and webs within and substantially parallel to said cover side walls, said cover being bonded to said container along the periphery of the side walls and the mating edges of the cover webs and the container partition members, coacting to close said compartments about each individual cell, and wherein alignment means secured to the inside of said cover align said cover webs with said partition members;
   e. at least one intercell connector, secured to said cover, on the inner surface, electrically connecting said cells;
   f. battery terminals secured to and passing through said cover arranged so as to make external electrical contact with an electrode of one cell and the electrode of opposite polarity of another cell;
   g. the bond formed between said cover and said container maintaining contact pressure between the cells, intercell connectors, and battery terminals.

2. The battery defined by claim 1 wherein said intercell connector electrically connects said cells in series relationship.

3. The battery defined by claim 1 having at least one intercell connecting clip secured to said partition member, said intercell connecting clip and said intercell connector electrically connecting said cells in parallel relationship.

4. The battery defined by claim 1 in which at least one boss is provided on the inner surface of said cover to prevent cell movement along the cell axis substantially parallel to said cover side walls.

5. The battery defined by claim 1 in which circular ridges formed on the inside of said base are provided to raise said galvanic cells above said base.

6. The battery defined by claim 1 wherein said container, partition members, cover, and cover webs are composed of a plastic material.

7. The battery defined by claim 1 wherein said partition members are integrally formed with said container, and said cover webs are integrally formed with said cover.

8. The battery defined by claim 5 wherein said partition members are parallel to said container side walls, and said cover webs are parallel to said cover side walls and notched so as to allow said intercell connectors to connect in said adjacent compartments.

9. The battery of claim 4 wherein said alignment means and said boss are integrally formed with said cover.

* * * * *

PO-1050
(5/69)

UNITED STATES PATENT OFFICE
CERTIFICATE OF CORRECTION

Patent No. 3,650,841      Dated March 21, 1972

Inventor(s) Robert Edwin Brindley

It is certified that error appears in the above-identified patent and that said Letters Patent are hereby corrected as shown below:

Column 2, line 44 delete "13,".

Column 2, line 72, delete "1 1/8" and insert therefor -- connecting --.

Column 4, line 8, delete "1" and insert therefor --1-1/8--.

Signed and sealed this 7th day of November 1972.

(SEAL)
Attest

EDWARD M. FLETCHER, JR.
Attesting Officer

ROBERT GOTTSCHALK
Commissioner of Patents